US011500656B2

(12) United States Patent
Mancharan et al.

(10) Patent No.: US 11,500,656 B2
(45) Date of Patent: *Nov. 15, 2022

(54) SYSTEMS AND METHODS FOR ALTERING A GUI IN RESPONSE TO IN-SESSION INFERENCES

(71) Applicant: Walmart Apollo, LLC, Bentonville, AR (US)

(72) Inventors: Shirpaa Mancharan, Santa Clara, CA (US); Sushant Kumar, Sunnyvale, CA (US); Evren Korpeoglu, San Jose, CA (US); Kannan Achan, Saratoga, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/200,860

(22) Filed: Mar. 14, 2021

(65) Prior Publication Data

US 2021/0200562 A1 Jul. 1, 2021

Related U.S. Application Data

(63) Continuation of application No. 16/260,361, filed on Jan. 29, 2019, now Pat. No. 10,949,224.

(51) Int. Cl.
*G06F 3/048* (2013.01)
*G06F 9/451* (2018.01)
(Continued)

(52) U.S. Cl.
CPC .......... *G06F 9/451* (2018.02); *G06F 11/3438* (2013.01); *G06F 11/3452* (2013.01); *G06F 16/909* (2019.01); *G06N 7/005* (2013.01)

(58) Field of Classification Search
CPC .. G06F 9/451; G06F 11/3438; G06F 11/3452; G06F 16/909; G06F 2201/875;
(Continued)

(56) References Cited

U.S. PATENT DOCUMENTS 7,072,888 B1 7/2006 Perkins
7,752,054 B1 7/2010 Anthony-Hoppe et al.
(Continued)

FOREIGN PATENT DOCUMENTS

| JP | 2004280361 | 10/2004 |
|---|---|---|
| JP | 2008299370 | 9/2016 |
| WO | 9852011 | 11/1998 |

OTHER PUBLICATIONS

Chung et al., "Deep Neural Network Using Trainable Activation Functions," Electronics and Telecommunications Research Institute, 2016. 2016.

(Continued)

*Primary Examiner* — Aleksey Olshannikov
(74) *Attorney, Agent, or Firm* — Bryan Cave Leighton Paisner LLP

(57) ABSTRACT

Systems and methods including one or more processors and one or more non-transitory computer readable storage devices storing computing instructions configured to run on the one or more processing modules and perform: gathering first data comprising first interactions of a user with a first graphical user interface; storing the first data comprising the first interactions of the user with the first graphical user interface as at least one first vector by adding to the at least one first vector for each level of a hierarchical categorization of the first user interface; gathering second data comprising second interactions of the user with a second graphical user interface; storing the second data comprising the second interactions of the user with the second graphical user interface as at least one second vector; determining an intent
(Continued)

of the user using the at least one first vector, the at least one second vector, and a predictive algorithm; and transmitting instructions to display a third graphical user interface for the user based upon the intent of the user. Other embodiments are disclosed herein.

20 Claims, 6 Drawing Sheets

(51) Int. Cl.
*G06N 7/00* (2006.01)
*G06F 16/909* (2019.01)
*G06F 11/34* (2006.01)

(58) Field of Classification Search
CPC .. G06F 2201/88; G06N 7/005; G06N 3/0481; G06N 3/08
See application file for complete search history.

(56) References Cited

U.S. PATENT DOCUMENTS

| | | | |
|---|---|---|---|
| 7,801,885 B1 | 9/2010 | Verma | |
| 7,827,170 B1 | 11/2010 | Horling et al. | |
| 9,047,870 B2 | 6/2015 | Ballinger et al. | |
| 10,002,368 B1 | 6/2018 | Els et al. | |
| 10,037,357 B1 | 7/2018 | Donaker et al. | |
| 2002/0002538 A1 | 1/2002 | Ling | |
| 2003/0100931 A1 | 5/2003 | Mullett | |
| 2003/0149937 A1 | 8/2003 | McElfresh et al. | |
| 2005/0102202 A1 | 5/2005 | Linden et al. | |
| 2005/0125382 A1 | 6/2005 | Kamawat et al. | |
| 2005/0222989 A1 | 10/2005 | Haveliwala et al. | |
| 2006/0204142 A1 | 9/2006 | West et al. | |
| 2007/0192166 A1 | 8/2007 | Van Luchene | |
| 2008/0162268 A1 | 7/2008 | Gilbert | |
| 2008/0235162 A1 | 9/2008 | Spring | |
| 2008/0243638 A1 | 10/2008 | Chan | |
| 2009/0044106 A1 | 2/2009 | Berkner et al. | |
| 2009/0248608 A1 | 10/2009 | Ravikumar et al. | |
| 2009/0307002 A1 | 12/2009 | Costanzo et al. | |
| 2010/0106595 A1 | 4/2010 | Baugher | |
| 2010/0125573 A1 | 5/2010 | Venolia | |
| 2010/0250714 A1 | 9/2010 | Wehrmann et al. | |
| 2011/0035379 A1 | 2/2011 | Chen | |
| 2011/0078554 A1 | 3/2011 | Nie et al. | |
| 2011/0184806 A1 | 7/2011 | Chen et al. | |
| 2011/0238478 A1 | 9/2011 | Gottfurcht et al. | |
| 2011/0307411 A1 | 12/2011 | Bolivar et al. | |
| 2012/0036123 A1 | 2/2012 | Hasan et al. | |
| 2012/0042232 A1 | 2/2012 | Brelsford et al. | |
| 2012/0143789 A1 | 6/2012 | Wang et al. | |
| 2012/0173338 A1 | 7/2012 | Ariel et al. | |
| 2012/0226562 A1 | 9/2012 | Baum et al. | |
| 2012/0284275 A1 | 11/2012 | Vadrevu et al. | |
| 2012/0317088 A1 | 12/2012 | Pantel et al. | |
| 2013/0013448 A1 | 1/2013 | Bradley et al. | |
| 2013/0047062 A1 | 2/2013 | McElfresh et al. | |
| 2013/0282682 A1 | 10/2013 | Batraski et al. | |
| 2014/0122464 A1 | 5/2014 | Arunachalam et al. | |
| 2014/0149399 A1 | 5/2014 | Kurzion | |
| 2014/0279233 A1 | 9/2014 | Lau et al. | |
| 2014/0279993 A1 | 9/2014 | Bernhardt et al. | |
| 2014/0304278 A1 | 10/2014 | Kleiman et al. | |
| 2014/0337171 A1 | 11/2014 | Sivashanmugam et al. | |
| 2015/0007064 A1 | 1/2015 | Givoni | |
| 2015/0046841 A1* | 2/2015 | Sharon | H04L 67/22 715/753 |
| 2015/0066597 A1 | 3/2015 | Givoni | |
| 2015/0127439 A1 | 5/2015 | Campos de Figueiredo Faceira et al. | |
| 2015/0206199 A1 | 7/2015 | Zhang | |
| 2016/0035234 A1 | 2/2016 | Choi et al. | |
| 2016/0140130 A1 | 5/2016 | Smirnov et al. | |
| 2016/0140626 A1 | 5/2016 | Agarwal et al. | |
| 2016/0232575 A1 | 8/2016 | Kirti et al. | |
| 2016/0306798 A1 | 10/2016 | Guo et al. | |
| 2016/0321716 A1 | 11/2016 | Ravikant et al. | |
| 2016/0349928 A1* | 12/2016 | Li | G06K 9/00463 |
| 2017/0026703 A1 | 1/2017 | Phadnis | |
| 2017/0171580 A1 | 6/2017 | Hirsch et al. | |
| 2017/0223406 A1 | 8/2017 | Kaliamoorthi et al. | |
| 2018/0060936 A1 | 3/2018 | Gupta et al. | |
| 2018/0096399 A1 | 4/2018 | Delayen et al. | |
| 2018/0108093 A1 | 4/2018 | Podgomy et al. | |
| 2018/0181569 A1 | 6/2018 | Jarr et al. | |
| 2019/0042981 A1* | 2/2019 | Bendfeldt | G06F 9/451 |
| 2019/0205472 A1* | 7/2019 | Kulkarni | G06F 3/04812 |
| 2020/0152184 A1* | 5/2020 | Steedman Henderson | G06N 3/084 |
| 2021/0117935 A1 | 4/2021 | Fineman et al. | |

OTHER PUBLICATIONS

Chen et al., "An Optimization Model for Product Placement on Product Listing Pages" 2014.
Elwany et al., "The Layout Problem: Investigation and Aggregation of Artificial Intelligence and Optimization Techniques" 2006.
Slawski, B., "Query Refinements Have Changed Since the Earlier Days of Google" 2017.
Suchacka et al. Using association rules to assess purchase probability in online stores. (Year 2016) Sep. 6, 2016.
W. Reinartz and P. Saffert, "Creativity in Advertising: When It Works and When It Doesn't," 2013 (Year: 2013) 2013.
J. Zhu et al., "Dynamic Hierarchical Markov Random Fields for Integrated Web Data Extraction," Journal of Machine Learning Research 9 (2008) pp. 1583-1614, Jul. 2008 Jul. 2008.
E. Callerstrom and K. Elfstrom, "Multipurpose Scheduling of Synchronous Data Flow Graphs Using Local Search Algorithms," KTH Information and Communication Technology, Ex. I Sander, 68 pages, 2014 2014.
S. Chen and S. Smith, "Introducing a New Advantage of Crossover: Commonality-Based Selection," Published Jun. 9, 1999, GECCO Conference Jun. 9, 1999.

* cited by examiner

500

| 501 – Combining the historical data and the in-session data |

| 502 – Storing second historical data as at least one second historical feature vector |

| 503 – Gathering second in-session data |

| 504 – Storing second in-session data as at least one second in-session feature vector |

| 505 – Determining a second intent of the user |

| 506 – Transmitting instructions to display a GUI |

FIG. 5

SYSTEMS AND METHODS FOR ALTERING A GUI IN RESPONSE TO IN-SESSION INFERENCES

CROSS-REFERENCE TO RELATED APPLICATION

This application is a continuation of application Ser. No. 16/260,361, filed Jan. 29, 2019, which is herein incorporated by this reference in its entirety.

TECHNICAL FIELD

This disclosure relates generally to graphical user interfaces (GUIs), and more specifically relates to systems and methods for changing GUIs in response to an intent of a user.

BACKGROUND

Designing and altering graphical user interfaces ("GUIs") based on long-term views of user activity can have its limitations. It is often the case that users have an established long-term GUI interaction pattern that can be discovered by looking at historical use, but focusing strictly on a long-term use pattern can neglect the short-term intent that users are expressing. This situation can create an inefficient and un-optimized user experience that can be compounded on devices with small screens, which are already difficult to navigate. Therefore, there is a need for a system and/or method for designing and/or altering GUIs that that (1) remains faithful to well-established trends in user interaction, but (2) can quickly alter or synthesize a GUI based upon short-term, in-session behavior when an intent of a user is identified.

BRIEF DESCRIPTION OF THE DRAWINGS

To facilitate further description of the embodiments, the following drawings are provided in which:

FIG. 5 is a flowchart for a method, according to certain embodiments; and

Figure 1:
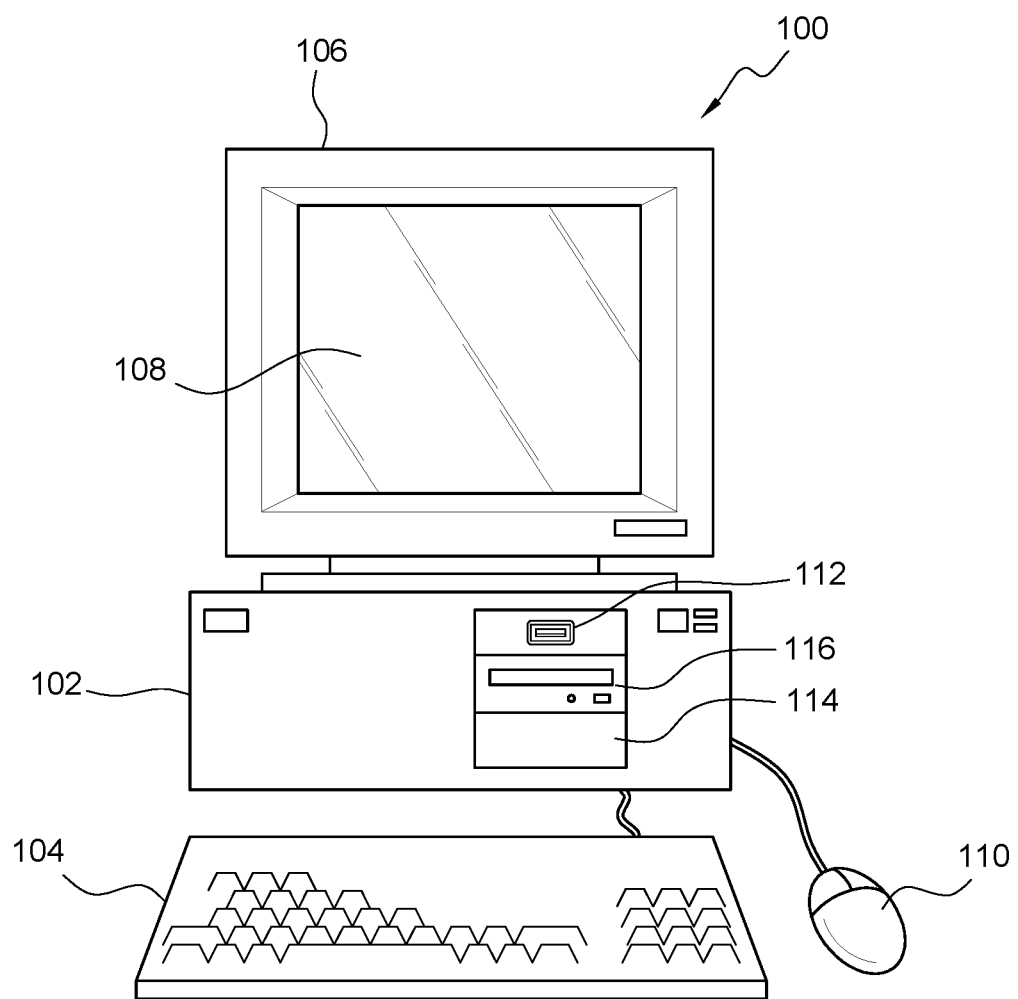
FIG. 1 illustrates a front elevational view of a computer system that is suitable for implementing various embodiments of the systems disclosed in FIGS. 3 and 6.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform: gathering first data comprising first interactions of a user with a first graphical user interface; storing the first data comprising the first interactions of the user with the first graphical user interface as at least one first vector by adding to the at least one first vector for each level of a hierarchical categorization of the first user interface; gathering second data comprising second interactions of the user with a second graphical user interface; storing the second data comprising the second interactions of the user with the second graphical user interface as at least one second vector; determining an intent of the user using the at least one first vector, the at least one second vector, and a predictive algorithm; and transmitting instructions to display a third graphical user interface for the user based upon the intent of the user.

Various embodiments include a method. The method can be implemented via execution of computing instructions configured to run at one or more processors and configured to be stored at non-transitory computer-readable media The method can comprise gathering first data comprising first interactions of a user with a first graphical user interface; storing the first data comprising the first interactions of the user with the first graphical user interface as at least one first vector by adding to the at least one first vector for each level of a hierarchical categorization of the first user interface; gathering second data comprising second interactions of the user with a second graphical user interface; storing the second data comprising the second interactions of the user with the second graphical user interface as at least one second vector; determining an intent of the user using the at least one first vector, the at least one second vector, and a predictive algorithm; and transmitting instructions to display a third graphical user interface for the user based upon the intent of the user.

Figure 2:
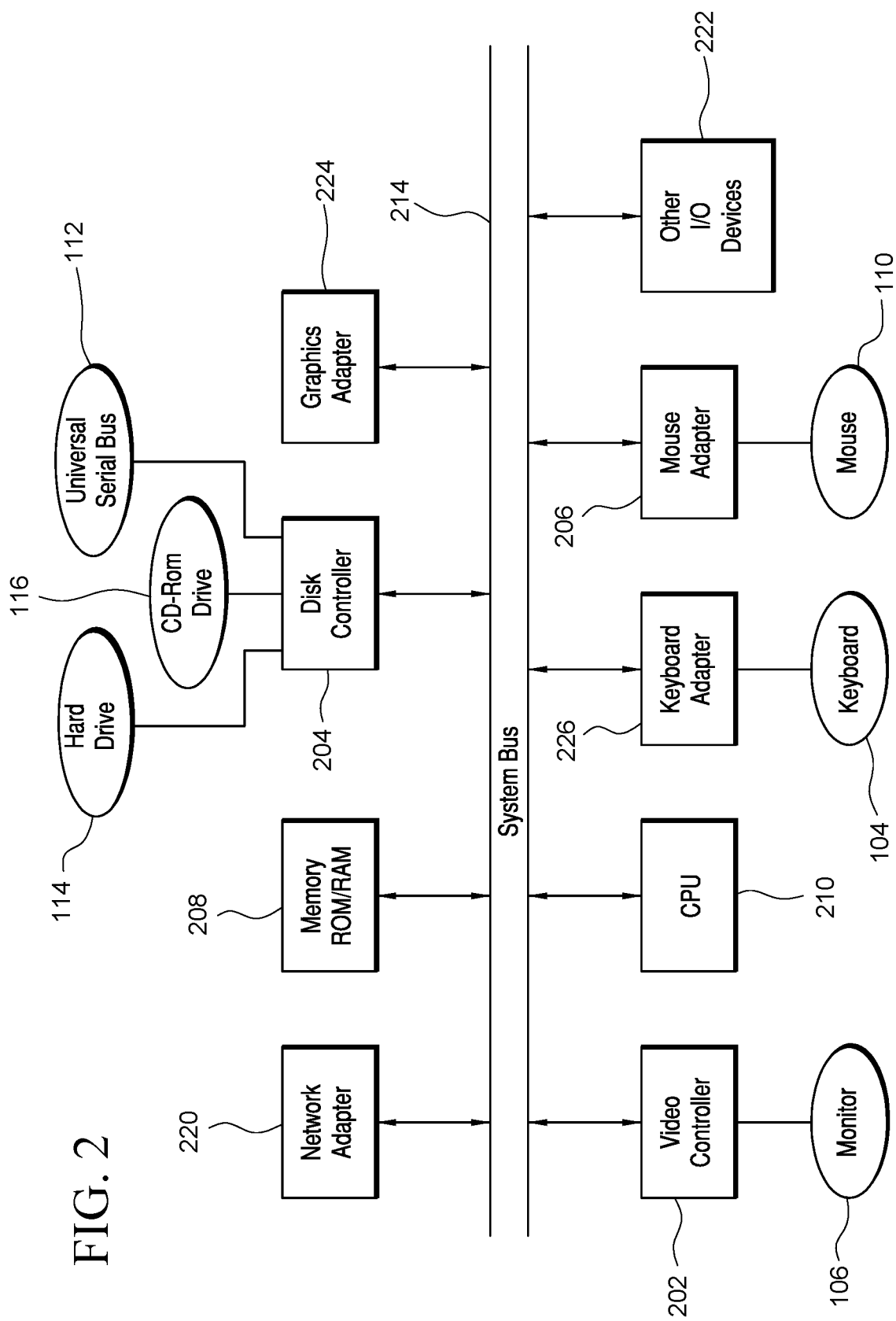
FIG. 2 illustrates a representative block diagram of an example of the elements included in the circuit boards inside a chassis of the computer system of FIG. 1.

A number of embodiments can include a system. The system can include one or more processors and one or more non-transitory storage devices computing instructions configured to run on the one or more processors. The computing instructions can be configured to run on the one or more processors and perform acts of gathering historical data, which can comprise interactions of a user with a first graphical user interface at a first time; storing the historical data which can comprise the interactions of the user with the first graphical user interface as at least one historical feature vector; gathering in-session data, which can comprise interactions of the user with a second graphical user interface at a second time later than the first time; storing the in-session data which can comprise the interactions of the user with the second graphical user interface as at least one in-session feature vector; determining an intent of the user using the at least one historical feature vector and the at least one in-session feature vector; and transmitting instructions to display a third graphical user interface for the user based upon the intent of the user Various embodiments include a method. The method can include gathering historical data, which can comprise interactions of a user with a first graphical user interface at a first time; storing the historical data which can comprise the interactions of the user with the first graphical user interface as at least one historical feature vector; gathering in-session data, which can comprise interactions of the user with a second graphical user interface at a second time later than the first time; storing the in-session data which can comprise the interactions of the user with the second graphical user interface as at least one in-session feature vector; determining an intent of the user using the at least one historical feature vector and the at least one in-session feature vector; and transmitting instructions to display a third graphical user interface for the user based upon the intent of the user Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
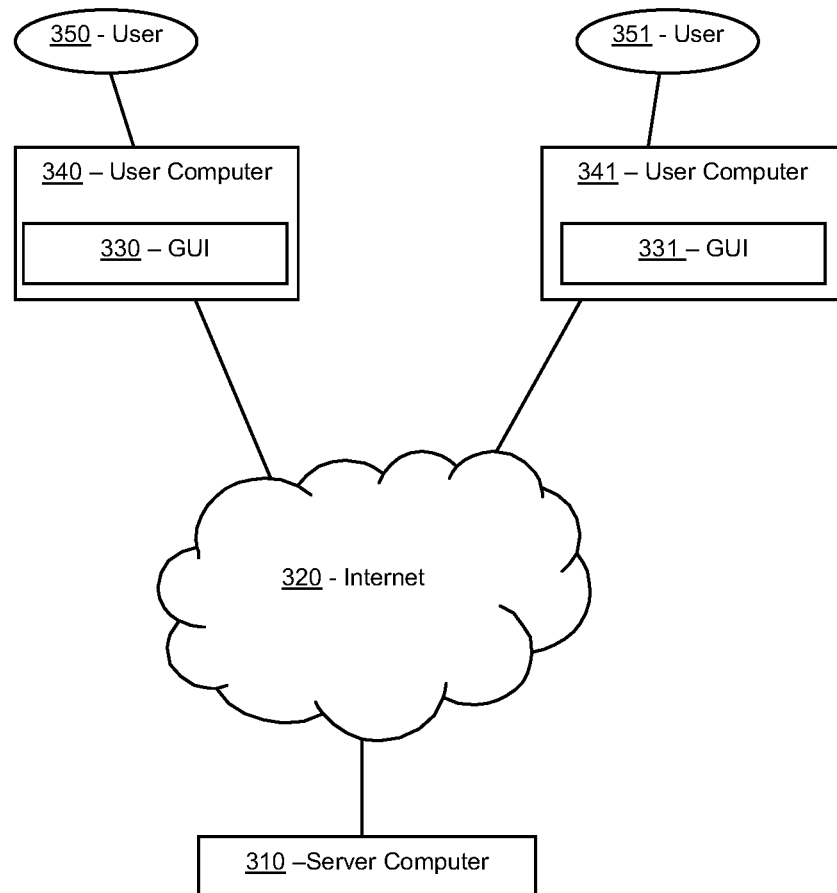
FIG. 3 illustrates a representative block diagram of a system, according to an embodiment.

Turning ahead in the drawings, FIG. 3 illustrates a block diagram of a system 300 that can be employed for altering user interfaces in response to predicted user activity, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a server computer 310, internet 320, user computers 340, 341, and/or GUI 330, 331. Server computer 310, internet 320, GUI 330, and/or user computer 340 can each be a computer system, such as computer system 100 (FIG. 1), as described above, and can each be a single computer, a single server, or a cluster or collection of computers or servers, or a cloud of computers or servers. In another embodiment, a single computer system can host each of two or more of server computer 310 and/or internet 320. Additional details regarding server computer 310, internet 320, GUI 330, and/or user computer 340 are described herein.

In many embodiments, system 300 also can comprise user computers 340, 341. User computers 340, 341 can comprise any of the elements described in relation to computer system 100. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, system 300 can comprise graphical user interface ("GUI") 330, 331. In the same or different embodiments, GUI 330, 331 can be part of and/or displayed by user computers 340, 341, which also can be part of system 300. In some embodiments, GUI 330, 331 can comprise text and/or graphics (image) based user interfaces. In the same or different embodiments, GUI 330, 331 can comprise a heads up display ("HUD"). When GUI 330, 331 comprises a HUD, GUI 330, 331 can be projected onto glass or plastic, displayed in midair as a hologram, or displayed on monitor 106 (FIG. 1). In various embodiments, GUI 330, 331 can be color or black and white. In many embodiments, GUI 330, 331 can comprise an application running on a computer system, such as computer system 100, user computers 340, 341, and/or server computer 310. In the same or different embodiments, GUI 330, 331 can comprise a website accessed through internet 320. In some embodiments, GUI 330, 331 can comprise an eCommerce website. In the same or different embodiments, GUI 330, 331 can be displayed as or on a virtual reality (VR) and/or augmented reality (AR) system or display.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, server computer 310, internet 320, GUI 330, 331, and/or user computer 340, 341 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) server computer 310, internet 320, GUI 330, 331, and/or user computer 340, 341 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of server computer 310, internet 320, GUI 330, 331, and/or user computer 340, 341. In a similar manner, the processing module(s) and the memory storage module(s) can be local and/or remote to each other.

In many embodiments, server computer 310, internet 320, GUI 330, 331, and/or user computer 340, 341 can be configured to communicate with one or more user computers 340 and 341. In some embodiments, user computers 340 and 341 also can be referred to as customer computers. In some embodiments, server computer 310, internet 320, GUI 330, 331, and/or user computer 340, 341 can communicate or interface (e.g., interact) with one or more customer computers (such as user computers 340 and 341) through a network or internet 330. Internet 330 can be an intranet that is not open to the public. Accordingly, in many embodiments, server computer 310, internet 320, GUI 330, 331, and/or user computer 340, 341 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, server computer 310, internet 320, GUI 330, 331, and/or user computer 340, 341 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between server computer 310, internet 320, GUI 330, 331, and/or user computer 340, 341, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, the techniques described herein can provide several technological improvements. Specifically, the techniques described herein provide for the ability to determine an intent of a user over a computer network based upon in-session interactions with a GUI. This approach is different from previous approaches, which were unable to determine intents of a user based upon in-session interactions with a GUI. Further, by customizing a GUI on a user computer in response to this intent, navigation by the user on the user computer can be greatly improved and tailored to the user's specific intent. This can be especially applicable when an intent is identified that would make it difficult for a user to accomplish this intent on a computer with a small screen, such as on a mobile electronic device as described above. Further, these small screens provide very little area for displaying pictures and/or text on a GUI. The techniques described herein can be used to more efficiently utilize this limited display area (e.g., by rearranging a GUI for easier navigation or displaying relevant information on a GUI pertaining to the user's state) in response to an identified intent of a user.

Figure 4:
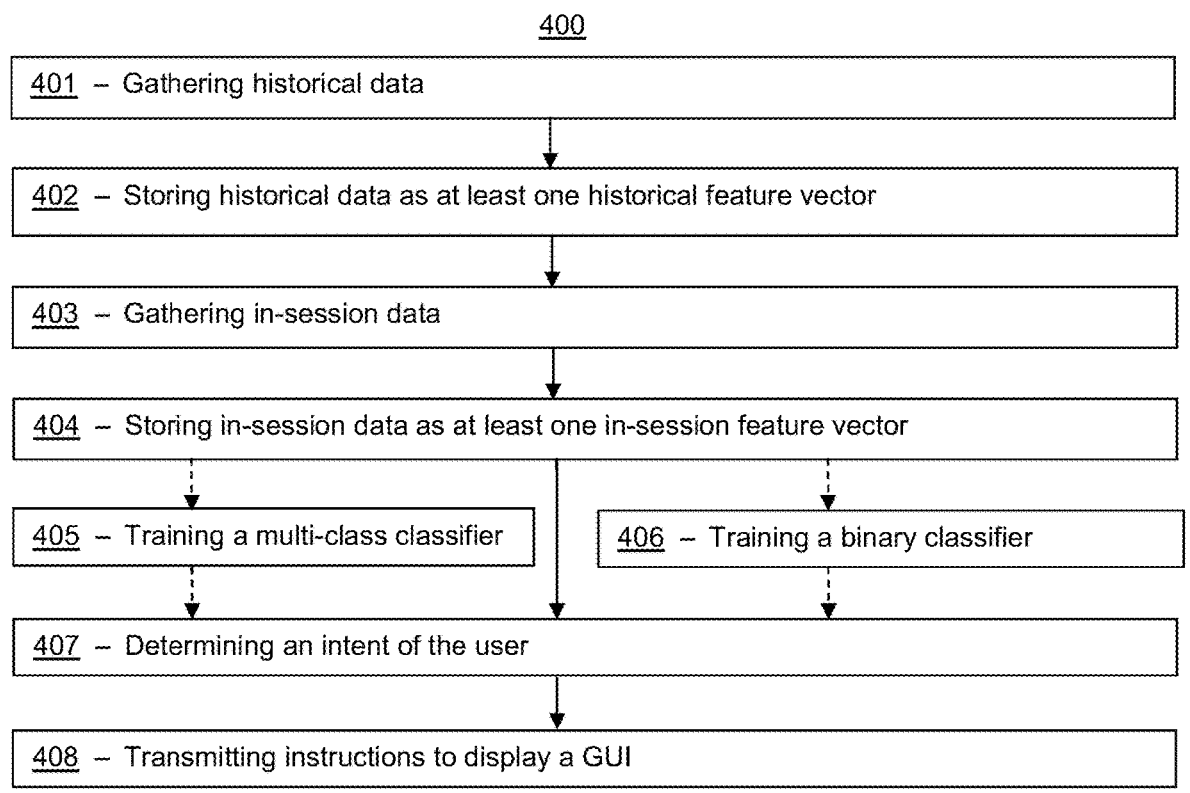
FIG. 4 is a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules Such non-transitory memory storage modules can be part of a computer system such as server computer 310, internet 320, GUI 330, 331, and/or user computer 340, 341 (FIG. 3). The processing module(s) can be similar or identical to the processing module(s) described above with respect to computer system 100 (FIG. 1).

In many embodiments, method 400 can comprise an activity 401 of gathering historical data. In various embodiments, historical data can comprise interactions of a user with a first GUI, a past geographical location of a user, and/or demographics of a user. In some embodiments, a first GUI can comprise GUI 330, 331 (FIG. 3), a second GUI as described in activity 402 (FIG. 4), a third GUI as described in activity 408 (FIG. 4), a fourth GUI as described in activity 503 (FIG. 5), and/or a fifth GUI as described in activity 506 (FIG. 5). In the same or different embodiments, interactions of a user with a first GUI can comprise views of an item of a category of items, cart adds of an item of a category of items, registry adds of an item of a category of items, transactions involving an item of the category of items, searches for the item of the category of items, mouse movements of a user, touch pad movements of a user, touchscreen interactions of a user, and/or eye movements of a user. In many embodiments, historical data can be collected at a first time. In some embodiments, a first time can be described relative to a second time as described in activity 403. In various embodiments, a first time can be earlier than a second time. In the same or different embodiments, a first time can comprise a time period, such as 1 day, 2 days, 3 days, 4 days, 5 days, 1 month, 2 months, 3 months, 4 months, 5 months, 1 year, 2 years, 3 years, 4 years, 5 years, etc. In some embodiments, activity 401 and other activities in method 400 can comprise using a distributed network comprising distributed memory architecture to gather historical data. This distributed architecture can reduce the impact on the network and system resources to reduce congestion in bottlenecks while still allowing data to be accessible from a central location. Using distributed architecture can be especially applicable for gathering historic data because gathering large datasets can reduce processing speeds and increase processing burdens on single processor computer systems as well as increase storage burdens on non-distributed systems.

In many embodiments, after activity 401, method 400 can continue with or comprise an activity 402 of storing historical data as at least one historical feature vector. In various embodiments, a feature vector can be configured to be used in a machine learning algorithm, as described in activities 405-408 and/or activity 505. In the same or different embodiments, historical data can be stored over discrete time periods. In many embodiments, a discrete time period can comprise a time period, such as 1 day, 2 days, 3 days, 4 days, 5 days, 1 month, 2 months, 3 months, 4 months, 5 months, 1 year, 2 years, 3 years, 4 years, 5 years, etc. In the same or different embodiments, a historical feature vector can comprise interactions of a user with a first GUI, a past geographical location of a user, and/or demographics of a user. In some embodiments, a first GUI can comprise GUI 330, 331 (FIG. 3), a second GUI as described in activity 402 (FIG. 4), a third GUI as described in activity 408 (FIG. 4), a fourth GUI as described in activity 503 (FIG. 5), and/or a fifth GUI as described in activity 506 (FIG. 5). In various embodiments, when interactions of a user with a first GUI occur, a count can be added to a historical feature vector for that interaction. For example, when a user interacts with a website for an item comprising a taxonomy of "Electronics/Camera/SLRcameras/Canon" counts will be added to historical feature vectors for: "Electronics," "Electronics/Camera," "Electronics/Camera/SLRcameras," and "Electronics/Camera/SLRcameras/Canon." In many embodiments, a historical feature vector can comprise information about a static attribute of a user. For example, a static attribute can comprise demographic information (e.g. gender, race, etc.). In embodiments where a historical feature vector comprises information about a static attribute of a user, a count can be assigned to a specific value of the static attribute. For example, when a gender of a user comprises male, a count of 20 can be applied to a historical feature vector for gender, and, when a gender of a user comprises female, a count of 25 can be applied to a historical feature vector for gender. In some embodiments, activity 402 and other activities in method 400 can comprise using a distributed network comprising distributed memory architecture to store historical data. This distributed architecture can reduce the impact on the network and system resources to reduce congestion in bottlenecks while still allowing data to be accessible from a central location. Using distributed architecture can be especially applicable for storing historic data, as storing large datasets can reduce storage capacity thereby slowing down non-distributed systems.

In many embodiments, after activity 402, method 400 can continue with or comprise activity 403 of gathering in-session data. In various embodiments, in-session data can comprise interactions of a user with a second GUI, a current geographical location of a user, a date on which in-session data is gathered, weather patterns at the geographical location of the user, current events at the geographical location of the user, and/or demographics of a user. In some embodiments, a second GUI can comprise GUI 330, 331 (FIG. 3), a first GUI as described in activity 401, a third GUI as described in activity 408, a fourth GUI as described in activity 503 (FIG. 5), and/or a fifth GUI as described in activity 506 (FIG. 5). In the same or different embodiments, interactions of a user with a second GUI can comprise views of an item of a category of items, cart adds of an item of a category of items, registry adds of an item of a category of items, transactions involving an item of the category of items, searches for the item of the category of items, mouse movements of a user, touch pad movements of a user, touchscreen interactions of a user, and/or eye movements of a user. In many embodiments, in-session data can be collected at a second time. In some embodiments, a second time can be described relative to a first time as described in activity 401. In various embodiments, a second time can be later than a first time. In the same or different embodiments, a second time can comprise a time period such as 1 second, 2 seconds, 3 seconds, 4 seconds, 5 seconds, 1 minute, 2 minutes, 3 minutes, 4 minutes, 5 minutes, 1 hours, 2 hours, 3 hours, 4 hours, 5 hours, 1 day, 2 days, 3 days, 4 days, 5 days, 1 month, 2 months, 3 months, 4 months, 5 months, 1 year, 2 years, 3 years, 4 years, 5 years, etc. In various embodiments, interactions of a user with a second GUI can occur within only one user session. In the same or different embodiments, a user session can begin when a user logs into an account and can end when a user logs out of the account. In various embodiments, a user session can begin when a user navigates to a webpage, and can end when a user navigates away from a webpage. In the same or different embodiments, a user session can begin when a user navigates to a website, and can end when a user navigates away from a website and/or completes a task on a website. In some embodiments, activity 403 and other activities in method 400 can comprise using a distributed network comprising distributed memory architecture to gather in-session data. This distributed architecture can reduce the impact on the network and system resources to reduce congestion in bottlenecks while still allowing data to be accessible from a central location.

In many embodiments, after activity 403, method 400 can continue with or comprise an activity 404 of storing in-session data as at least one feature vector. In various embodiments, a feature vector can be configured to be used in a machine learning algorithm, as described in activities 405-408 and/or activity 505. In various embodiments, when interactions of a user with a second GUI occur, a count can be added to a feature vector for that interaction. For example, when a user interacts with a website for an item comprising a taxonomy of "Electronics/Camera/SLRcameras/Canon" counts will be added to feature vectors for: "Electronics," "Electronics/Camera," "Electronics/Camera/SLRcameras," and "Electronics/Camera/SLRcameras/Canon." In many embodiments, a feature vector can comprise information about a static attribute of a user. For example, a static attribute can comprise demographic information (e.g. gender, race, etc.). In embodiments where a feature vector comprises information about a static attribute of a user, a count can be assigned to a specific value of the static attribute. For example, when a gender of a user comprises male, a count of 20 can be applied to a feature vector for gender, and, when a gender of a user comprises female, a count of 25 can be applied to a feature vector for gender. In some embodiments, activity 404 and other activities in method 400 can comprise using a distributed network comprising distributed memory architecture to store in-session data. This distributed architecture can reduce the impact on the network and system resources to reduce congestion in bottlenecks while still allowing data to be accessible from a central location.

In many embodiments, after activity 404, method 400 can continue with or comprise an activity 405 of training a multi-class classifier. In the same or different embodiments, training a multi-class classifier can be referred to as using a machine learning algorithm. In some embodiments, training a multi-class classifier can comprise estimating internal parameters of a model configured to classify an intent of a user from a set of different intents. In various embodiments, a multi-class classifier can be trained using labeled training data otherwise known as a training dataset. In many embodiments, a training dataset can comprise all or a part of historical data, as described in activities 401-402 and/or activities 501-502 (FIG. 5), that has been labeled with an intent. In some embodiments, a training dataset can be defined as $D=\{x_t, c_t\}_{t=0}^T$, wherein each $x_t$ comprises a $t^{th}$ feature vector $(u_h, u_s, i, a)^t$ and $c_t$ comprises a corresponding label. In various embodiments, a multi-class classifier can be trained using a logistic regression function by maximizing a log likelihood of data D. In many embodiments, a multi-class classifier can be configured to determine a probability of a user having one or more intents.

In the same or different embodiments, a multi-class classifier can be trained on a feed-forward neural network. As compared to a recurrent neural network, a feed forward neural network can comprise a neural network where connections between nodes in the network no not form a cycle. In other words, information is passed through a feed forward neural network in one direction: from input nodes, to hidden nodes when a hidden layer is used, and then to output nodes. In more specific embodiments, a feed forward neural network can comprise a neural network having two hidden layers. In some embodiments, each hidden layer can comprise 500 nodes.

In many embodiments, a node of a neural network can have an activation function also known as a rectifier. In the same or different embodiments, a rectifier can comprise a rectified linear unit ("ReLU"). In various embodiments, a node of a neural network can have a ReLU with a non-linear output, otherwise known as ReLU non-linearity. In many embodiments, a rectifier can comprise an equation comprising:

$$\mathrm{argmax}_w \sum_t \log p(c_t|x_t, w) = \mathrm{argmax}_w \sum_t \frac{1}{1+\exp(-w^T x_t)}.$$

In the same or different embodiments, each $x_t$ comprises a $t^{th}$ feature vector, $c_t$ comprises a corresponding label, and/or w can comprise a feature weight vector.

ReLU non-linearity can provide many advantages over traditional ReLUs. For example, ReLU non-linearity can allow for training of deep supervised neural networks without unsupervised pre-training. This training, though, can increase training time for multi-class classifiers on feed forward neural networks. Therefore, in some embodiments, activity 405 and other activities of method 400 can comprise using a distributed network comprising distributed memory architecture to train a multi-class classifier. This distributed architecture can reduce the impact on the network and system resources to reduce congestion in bottlenecks while still allowing data to be accessible from a central location. Use of distributed networks for training a multi-class classifier are especially applicable when ReLU non-linearity is used, as computation of large datasets can reduce processing speeds and increase processing burdens on single processor computer systems. In some embodiments, activity 405 and other activities in method 400 can comprise using a distributed network comprising distributed memory architecture to train a multi-class classifier. This distributed architecture can reduce the impact on the network and system resources to reduce congestion in bottlenecks while still allowing data to be accessible from a central location. Use of distributed networks are especially applicable for training a multi-class classifier, as computation of large datasets can reduce processing speeds and increase processing burdens on single processor computer systems.

In many embodiments, after activity 404, method 400 can continue with or comprise an activity 406 of training a binary classifier. In the same or different embodiments, training a binary classifier can be referred to as using a machine learning algorithm. In some embodiments, training a binary classifier can comprise estimating internal parameters of a model configured to determine a probability of a user having an intent. In various embodiments, a binary classifier can be trained using labeled training data otherwise known as a training dataset. In many embodiments, a training dataset can comprise all or a part of historical data, as described in activities 401-402 and/or activities 501-502 (FIG. 5), that has been labeled with an intent. In some embodiments, a training dataset can be defined as $D=\{x_t, c_t\}_{t=0}^{T}$, wherein each $x_t$ comprises a $t^{th}$ feature vector $(u_h, u_s, i, a)^t$ and $c_t$ comprises a corresponding label. In various embodiments, a binary classifier can be trained using a logistic regression function by maximizing a log likelihood of data D. In various embodiments, a binary classifier can be configured to determine a probability of a user having only one intent. In the same or different embodiments, a binary classifier can be trained on a feed-forward neural network. As compared to a recurrent neural network, a feed forward neural network can comprise a neural network where connections between nodes in the network no not form a cycle. In other words, information is passed through a feed forward neural network in one direction: from the input nodes, to the hidden nodes when a hidden layer is used, and then to the output nodes. In more specific embodiments, a feed forward neural network can comprise a neural network having two hidden layers. In some embodiments, each hidden layer can comprise 500 nodes.

In many embodiments, a node of a neural network can have an activation function also known as a rectifier. In the same or different embodiments, a rectifier can comprise a rectified linear unit ("ReLU"). In various embodiments, a node of a neural network can have a ReLU with a non-linear output, otherwise known as ReLU non-linearity. In many embodiments, a rectifier can comprise an equation comprising:

$$\mathrm{argmax}_w \sum_t \log p(c_t|x_t, w) = \mathrm{argmax}_w \sum_t \frac{1}{1+\exp(-w^T x_t)}.$$

In the same or different embodiments, t can comprise a number of feature vectors as time progresses, $c_t$ can comprise a number of interactions with a GUI, $x_t$ can comprise a feature vector, and/or w can comprise a feature weight vector.

ReLU non-linearity can provide many advantages over traditional ReLUs. For example, ReLU non-linearity can allow for training of deep supervised neural networks without unsupervised pre-training. This training, though, can increase training time for multi-class classifiers on feed forward neural networks. Therefore, in some embodiments, activity 406 and other activities of method 400 can comprise using a distributed network comprising distributed memory architecture to train a binary classifier. This distributed architecture can reduce the impact on the network and system resources to reduce congestion in bottlenecks while still allowing data to be accessible from a central location. Use of distributed networks for training a binary classifier are especially applicable when ReLU non-linearity is used, as computation of large datasets can reduce processing speeds and increase processing burdens on single processor computer systems. In some embodiments, activity 406 and other activities in method 400 can comprise using a distributed network comprising distributed memory architecture to train a binary classifier. This distributed architecture can reduce the impact on the network and system resources to reduce congestion in bottlenecks while still allowing data to be accessible from a central location. Use of distributed networks are especially applicable for training a binary classifier, as computation of large datasets can reduce processing speeds and increase processing burdens on single processor computer systems.

In many embodiments, after any of activities 404, 405, or 406, method 400 can continue with or comprise an activity 407 of determining an intent of a user. In some embodiments, an intent of a user can comprise a predicted interaction of a user with a GUI and/or a predicted short-term goal of the user with regards to a GUI. For example, an intent can comprise a user interaction with a certain aspect of a GUI (e.g. clicking or selecting a specific element of the GUI, looking at a specific portion of a GUI, etc.) and/or completing a specific task using a GUI (e.g. purchasing an item, selecting in-store pick-up, navigating to a specific webpage using the GUI, etc.). In the same or different embodiments, an intent of a user can be determined using at least one historical feature vector as described in activity 402. In various embodiments, an intent of a user can be determined using at least one in-session feature vector, as described in activity 404. In some embodiments, an intent of a user can be determined using a multi-class classifier, as described in activity 405. In the same or different embodiments, using a multi-class classifier can be referred to as using a machine learning algorithm. In many embodiments, an intent of a user can be determined using a binary classifier, as described in activity 406. In various embodiments, using a binary classifier can be referred to as using a machine learning algorithm. In the same or different embodiments, determining an intent of a user can comprise determining a probability of a user having an intent. In various embodiments, when a probability of a user having an intent is above a predefined threshold, activity 408 can be performed. In the same or different embodiments, determining an intent of a user can comprise using a set of equations comprising:

$$P(c|u_h, u_s, a) = \sum_{i \in \mathcal{J}} P(c, i|u_h, u_s, a);$$

$$= \sum_{i \in \mathcal{J}} P(i|u_h, u_s, a) P(c|u_h, u_s, a); \text{ and}$$

$$= \sum_{i \in \mathcal{J}} P(i|u_s) P(c|u_h, u_s, i, a).$$

In the same or different embodiments, c comprises a probability of a user having a specific intent, $u_h$ comprises at least one historical feature vector, $u_s$ comprises at least one in-session feature vector, i comprises a user intent, J can comprise an intent of a set of intents, and/or a can comprise an asset of a set of assets. In many embodiments, an asset can comprise an element of a GUI that altered according to a disclosed system and/or method.

In some embodiments, activity 407 and other activities in method 400 can comprise using a distributed network comprising distributed memory architecture to determine an intent of a user. This distributed architecture can reduce the impact on the network and system resources to reduce congestion in bottlenecks while still allowing data to be accessible from a central location. Use of distributed networks are especially applicable for determining an intent of a user, as computation of large datasets can reduce processing speeds and increase processing burdens on single processor computer systems.

In many embodiments, after activity 407, method 400 can continue with or comprise activity 408 of transmitting instructions to display a GUI. In many embodiments, a GUI transmitted for display during activity 408 can be referred to as a third GUI. In some embodiments, transmitting instructions to display a GUI can occur in response to activity 407 of determining an intent of a user. In some embodiments, a first GUI can comprise GUI 330, 331 (FIG. 3), a first GUI as described in activity 401, a second GUI as described in activity 402, a fourth GUI as described in activity 503 (FIG. 5), and/or a fifth GUI as described in activity 506 (FIG. 5). In the same or different embodiments, a GUI transmitted for display during activity 408 can be similar or different than a GUI as described in activities 401, 402, 503 (FIG. 5), and/or 506 (FIG. 5). In various embodiments, transmitting instructions to display a GUI can comprise customizing a content of a GUI. In the same or different embodiments, customizing a content on a GUI can comprise altering an image displayed on the GUI, altering text on the GUI, altering a layout of the GUI, changing a type of the GUI, displaying an advertisement on the GUI, displaying no advertisement on the GUI, altering a color displayed on the GUI, etc. In many embodiments, customizing a GUI can comprise displaying certain content at specific times on the GUI. In further embodiments, content displayed on a GUI can comprise advertisements for products, services, and/or events. In various embodiments, a GUI transmitted for display during activity 408 can be related to an intent of a user. In many embodiments, a GUI transmitted for display during activity 408 can be optimized in order to facilitate the intent of the user. In many embodiments, transmitting a GUI for display during activity 408 can occur when a user is in a same session as described in activities 403-404. In some embodiments, activity 408 and other activities in method 400 can comprise using a distributed network comprising distributed memory architecture to transmit instructions to display a GUI. This distributed architecture can reduce the impact on the network and system resources to reduce congestion in bottlenecks while still allowing data to be accessible from a central location.

Turning ahead in the drawings, FIG. 5 illustrates a flow chart for a method 500, according to an embodiment. Method 500 is merely exemplary and is not limited to the embodiments presented herein. Method 500 can be employed in many different embodiments or examples not specifically depicted or described herein. In some embodiments, the activities of method 500 can be performed in the order presented. In other embodiments, the activities of method 500 can be performed in any suitable order. In still other embodiments, one or more of the activities of method 500 can be combined or skipped. In various embodiments, method 500 can be performed as a part of, in conjunction with, and/or completely separate from method 400 (FIG. 4). In many embodiments, system 300 (FIG. 3) can be suitable to perform method 500 and/or one or more of the activities of method 500. In these or other embodiments, one or more of the activities of method 500 can be implemented as one or more computer instructions configured to run at one or more processing modules and configured to be stored at one or more non-transitory memory storage modules, such non-transitory memory storage modules can be part of a computer system such as server computer 310, internet 320, GUI 330, 331, and/or user computer 340, 341 (FIG. 3). The processing module(s) can be similar or identical to the processing module(s) described above with respect to computer system 100 (FIG. 1).

In many embodiments, method 500 can comprise an activity 501 of combining historical data and in-session data. In many embodiments, a combination of historical data and in-session data can be referred to as second historical data. In the same or different embodiments, the historical data of activity 501 can comprise historical data as described in method 400 (FIG. 4). In various embodiments, the in-session data of activity 501 can comprise in-session data as described in method 400 (FIG. 4). In some embodiments, activity 501 can occur after a user session has ended, as described in activities 403-404. In the same or different embodiments, second historical data can be labeled used to train a multi-class classifier and/or a binary classifier as described in activity 405 (FIG. 4) or activity 406 (FIG. 4), respectively. In some embodiments, activity 501 and other activities in method 500 can comprise using a distributed network comprising distributed memory architecture to combine historical data and in-session data. This distributed architecture can reduce the impact on the network and system resources to reduce congestion in bottlenecks while still allowing data to be accessible from a central location. Using distributed architecture can be especially applicable for combining historical data and in-session data, as combining large datasets can reduce processing speeds and increase processing burdens on single processor computer systems.

In many embodiments, method 500 can continue with or comprise an activity 502 of storing second historical data as at least one second historical feature vector. In various embodiments, a second historical feature vector can be configured to be used in a machine learning algorithm, as described in activities 405-407 and/or activity 505. In various embodiments, when interactions of a user with a GUI occur, a count can be added to a second historical feature vector for that interaction. For example, when a user interacts with a website for an item comprising a taxonomy of "Electronics/Camera/SLRcameras/Canon" counts will be added to historical feature vectors for: "Electronics," "Electronics/Camera," "Electronics/Camera/SLRcameras," and "Electronics/Camera/SLRcameras/Canon." In many embodiments, a second historical feature vector can comprise information about a static attribute of a user. For example, a static attribute can comprise demographic information (e.g. gender, race, etc.). In embodiments where a feature vector comprises information about a static attribute of a user, a count can be assigned to a specific value of the static attribute. For example, when a gender of a user comprises male, a count of 20 can be applied to a second historical feature vector for gender, and, when a gender of a user comprises female, a count of 25 can be applied to a second historical feature vector for gender.

In some embodiments, activity 502 and other activities in method 500 can comprise using a distributed network comprising distributed memory architecture to store historical data. This distributed architecture can reduce the impact on the network and system resources to reduce congestion in bottlenecks while still allowing data to be accessible from a central location. Using distributed architecture can be especially applicable for storing historic data, as storing large datasets can reduce storage capacity thereby slowing down non-distributed systems.

In many embodiments, method 500 can continue with or comprise an activity 503 of gathering second in-session data. In some embodiments, second in-session data can be similar to in-session data as described in activity 403. Therefore, in various embodiments, second in-session data can comprise interactions of a user with a fourth GUI, a current geographical location of a user, a date on which in-session data is gathered, weather patterns at the geographical location of the user, current events at the geographical location of the user, and/or demographics of a user. In some embodiments, a fourth GUI can comprise GUI 330, 331 (FIG. 3), a first GUI as described in activity 401 (FIG. 4), a second GUI as described in activity 402 (FIG. 4), a third GUI as described in activity 408 (FIG. 4), and/or a fifth GUI as described in activity 506 (FIG. 5). In the same or different embodiments, interactions of a user with a fourth GUI can comprise views of an item of a category of items, cart adds of an item of a category of items, registry adds of an item of a category of items, transactions involving an item of the category of items, searches for the item of the category of items, mouse movements of a user, touch pad movements of a user, touchscreen interactions of a user, and/or eye movements of a user. In many embodiments, in-session data can be collected at a third time. In some embodiments, a third time can be described relative to a first time and/or a second time, as described in activities 401 and/or 403. In various embodiments, a third time can be later than a first time and/or a second time. In the same or different embodiments, a third time can comprise a time period such as 1 second, 2 seconds, 3 seconds, 4 seconds, 5 seconds, 1 minute, 2 minutes, 3 minutes, 4 minutes, 5 minutes, 1 hours, 2 hours, 3 hours, 4 hours, 5 hours, 1 day, 2 days, 3 days, 4 days, 5 days, 1 month, 2 months, 3 months, 4 months, 5 months, 1 year, 2 years, 3 years, 4 years, 5 years, etc. In various embodiments, interactions of a user with a fourth GUI can occur within only one user session. In the same or different embodiments, a user session can begin when a user logs into an account and can end when a user logs out of the account. In various embodiments, a user session can begin when a user navigates to a webpage, and can end when a user navigates away from the webpage. In the same or different embodiments, a user session can begin when a user navigates to a website or completes a first task on the website, and can end when a user navigates away from the website and/or completes a second task on the website. In many embodiments, a user session occurring during activity 503 can be the same or different than a user session occurring in activity 403. In some embodiments, activity 503 and other activities in method 500 can comprise using a distributed network comprising distributed memory architecture to gather in-session data. This distributed architecture can reduce the impact on the network and system resources to reduce congestion in bottlenecks while still allowing data to be accessible from a central location.

In many embodiments, method 500 can continue with or comprise an activity 504 of storing second in-session data as at least one second in-session feature vector. In various embodiments, a second in-session feature vector can be configured to be used in a machine learning algorithm, as described in activities 405-407 and/or activity 505. In various embodiments, when interactions of a user with a fourth GUI occur, a count can be added to a feature vector for that interaction. For example, when a user interacts with a website for an item comprising a taxonomy of "Electronics/Camera/SLRcameras/Canon" counts will be added to feature vectors for: "Electronics," "Electronics/Camera," "Electronics/Camera/SLRcameras," and "Electronics/Camera/SLRcameras/Canon." In many embodiments, a feature vector can comprise information about a static attribute of a user. For example, a static attribute can comprise demographic information (e.g. gender, race, etc.). In embodiments where a feature vector comprises information about a static attribute of a user, a count can be assigned to a specific value of the static attribute. For example, when a gender of a user comprises male, a count of 20 can be applied to a feature vector for gender, and, when a gender of a user comprises female, a count of 25 can be applied to a feature vector for gender. In some embodiments, activity 504 and other activities in method 500 can comprise using a distributed network comprising distributed memory architecture to store in-session data. This distributed architecture can reduce the impact on the network and system resources to reduce congestion in bottlenecks while still allowing data to be accessible from a central location.

In many embodiments, method 500 can continue with or comprise an activity 505 of determining an intent of a user. In some embodiments, an intent of a user can comprise a predicted interaction of a user with a GUI and/or a predicted short-term goal of the user with regards to a GUI. For example, an intent can comprise a user interaction with a certain aspect of a GUI (e.g. clicking or selecting a specific element of the GUI, looking at a specific portion of a GUI, etc.) and/or completing a specific task using a GUI (e.g. purchasing an item, selecting in-store pick-up, navigating to a specific webpage using the GUI, etc.). In the same or different embodiments, an intent of a user can be determined using at least one second historical feature vector, as described in activity 502. In various embodiments, an intent of a user can be determined using at least one second in-session feature vector, as described in activity 504. In some embodiments, an intent of a user can be determined using a multi-class classifier, as described in activity 405. In the same or different embodiments, using a multi-class classifier can be referred to as using a machine learning algorithm. In many embodiments, an intent of a user can be determined using a binary classifier, as described in activity 406. In various embodiments, using a binary classifier can be referred to as using a machine learning algorithm. In the same or different embodiments, determining an intent of a user can comprise determining a probability of a user having an intent. In various embodiments, when a probability of a user having an intent is above a predefined threshold, activity 506 can be performed. In the same or different embodiments, determining an intent of a user can comprise using a set of equations comprising:

$$P(c|u_h, u_s, a) = \sum_{i \in \mathcal{J}} P(c, i|u_h, u_s, a);$$

$$= \sum_{i \in \mathcal{J}} P(i|u_h, u_s, a)P(c|u_h, u_s, a); \text{ and}$$

$$= \sum_{i \in \mathcal{J}} P(i|u_s)P(c|u_h, u_s, i, a).$$

In the same or different embodiments, c comprises a probability of a user having a specific intent, $u_h$ comprises at least one historical feature vector, $u_s$ comprises at least one in-session feature vector, i comprises a user intent, J can comprise an intent of a set of intents, and/or a can comprise an asset of a set of assets. In many embodiments, an asset can comprise an element of a GUI that altered according to a disclosed system and/or method.

In some embodiments, activity 505 and other activities in method 500 can comprise using a distributed network comprising distributed memory architecture to determine an intent of a use. This distributed architecture can reduce the impact on the network and system resources to reduce congestion in bottlenecks while still allowing data to be accessible from a central location. Use of distributed networks are especially applicable for determining an intent of a user, as computation of large datasets can reduce processing speeds and increase processing burdens on single processor computer systems.

In many embodiments, method 500 can continue with or comprise activity 506 of transmitting instructions to display a GUI. In some embodiments, transmitting instructions to display a GUI can occur in response to activity 505 of determining an intent of a user. In various embodiments, a GUI transmitted for display in activity 506 can be referred to as a fifth GUI. In some embodiments, a fifth GUI can comprise GUI 330, 331 (FIG. 3), a first GUI as described in activity 401 (FIG. 4), a second GUI as described in activity 402 (FIG. 4), a third GUI as described in activity 408 (FIG. 4), and/or a fourth GUI as described in activity 503. In the same or different embodiments, a GUI transmitted for display during activity 506 can be similar or different than a GUI as described in activities 401 (FIG. 4), 403 (FIG. 4), 408 (FIG. 4), and/or 503. In various embodiments, transmitting instructions to display a GUI can comprise customizing a content of a GUI. In the same or different embodiments, customizing a content on a GUI can comprise altering an image displayed on the GUI, altering text on the GUI, altering a layout of the GUI, changing a type of the GUI, displaying an advertisement on the GUI, displaying no advertisement on the GUI, altering a color displayed on the GUI, etc. In many embodiments, customizing a content on a GUI can comprise displaying certain content at specific times. In further embodiments, a content on a GUI can comprise advertisements for products, services, and/or events. In various embodiments, a GUI transmitted for display during activity 408 can be related to an intent of a user. In many embodiments, a GUI transmitted for display during activity 506 can be optimized in order to facilitate the intent of a user. In many embodiments, transmitting a GUI display during activity 506 can occur when a user is in the same session as described in activities 403-404 and/or 503-504. In some embodiments, activity 506 and other activities in method 500 can comprise using a distributed network comprising distributed memory architecture to transmit instructions to display a GUI. This distributed architecture can reduce the impact on the network and system resources to reduce congestion in bottlenecks while still allowing data to be accessible from a central location.

Figure 6:
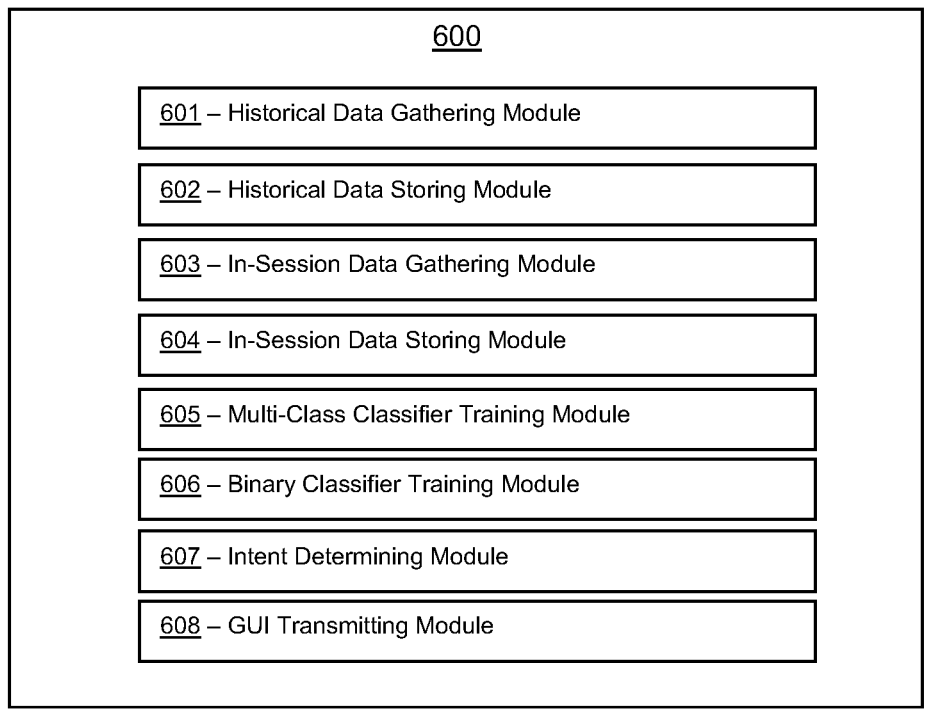
FIG. 6 illustrates a representative block diagram of a system, according to an additional embodiment.

Turning ahead in the drawings, FIG. 6 illustrates a block diagram of a system 600 that can be employed for altering a user interface using predicted user activity. System 600 is merely exemplary and embodiments of the system are not limited to the embodiments presented herein. In some embodiments, system 600 can be the same as system 300 (FIG. 3) System 600 can be employed in many different embodiments or examples not specifically depicted or described herein. In some embodiments, certain elements or modules of system 600 can perform various procedures, processes, and/or activities. In these or other embodiments, the procedures, processes, and/or activities can be performed by other suitable elements or modules of system 600.

Generally, therefore, system 600 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 600 described herein.

In many embodiments, system 600 can comprise non-transitory memory storage module 601. Memory storage module 601 can be referred to as historical data gathering module 601. In many embodiments, historical data gathering module 601 can store computing instructions configured to run on one or more processing modules and perform one or more acts of method 400 (FIG. 4) (e.g., activity 401 (FIG. 4)) and/or one or more acts of method 500 (FIG. 5) (e.g., activity 501 (FIG. 5)).

In many embodiments, system 600 can comprise non-transitory memory storage module 602. Memory storage module 602 can be referred to as historical data storing module 602. In many embodiments, historical data storing module 602 can store computing instructions configured to run on one or more processing modules and perform one or more acts of method 400 (FIG. 4) (e.g., activity 402 (FIG. 4)) and/or one or more acts of method 500 (FIG. 5) (e.g., activity 502 (FIG. 5)).

In many embodiments, system 600 can comprise non-transitory memory storage module 603. Memory storage module 603 can be referred to as in-session data gathering module 603. In many embodiments, in-session data gathering module 603 can store computing instructions configured to run on one or more processing modules and perform one or more acts of method 400 (FIG. 4) (e.g., activity 403 (FIG. 4)) and/or one or more acts of method 500 (FIG. 5) (e.g., activity 504 (FIG. 5)).

In many embodiments, system 600 can comprise non-transitory memory storage module 604. Memory storage module 604 can be referred to as in-session data storing module 604. In many embodiments, in-session data storing module 604 can store computing instructions configured to run on one or more processing modules and perform one or more acts of method 400 (FIG. 4) (e.g., activity 404 (FIG. 4)) and/or one or more acts of method 500 (e.g., activity 504 (FIG. 5)).

In many embodiments, system 600 can comprise non-transitory memory storage module 605. Memory storage module 605 can be referred to as multi-class classifier training module 605. In many embodiments, multi-class classifier training module 605 can store computing instructions configured to run on one or more processing modules and perform one or more acts of method 400 (FIG. 4) (e.g., activity 405 (FIG. 4)).

In many embodiments, system 600 can comprise non-transitory memory storage module 606. Memory storage module 606 can be referred to as binary classifier training module 606. In many embodiments, binary classifier training module 606 can store computing instructions configured to run on one or more processing modules and perform one or more acts of method 400 (FIG. 4) (e.g., activity 406 (FIG. 4)).

In many embodiments, system 600 can comprise non-transitory memory storage module 607. Memory storage module 607 can be referred to as intent determining module 607. In many embodiments, intent determining module 607 can store computing instructions configured to run on one or more processing modules and perform one or more acts of method 400 (FIG. 4) (e.g., activity 407 (FIG. 4)) and/or one or more acts of method 500 (FIG. 5) (e.g., 505 (FIG. 5)).

In many embodiments, system 600 can comprise non-transitory memory storage module 608. Memory storage module 608 can be referred to as GUI transmitting module 608. In many embodiments, GUI transmitting module 608 can store computing instructions configured to run on one or more processing modules and perform one or more acts of method 400 (FIG. 4) (e.g., activity 408 (FIG. 4)) and/or one or more acts of method 500 (FIG. 5) (e.g., activity 506 (FIG. 5)).

Although systems and methods for altering user interfaces using predicted user activity have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
  one or more processors; and
  one or more non-transitory computer-readable storage media storing computing instructions that, when executed on the one or more processors, cause the one or more processors to perform functions comprising:
    gathering first data comprising first interactions of a user with a first graphical user interface;
    storing the first data comprising the first interactions of the user with the first graphical user interface as at least one first vector by adding to the at least one first vector for each level of a hierarchical categorization of the first graphical user interface;
    gathering second data comprising second interactions of the user with a second graphical user interface;
    storing the second data comprising the second interactions of the user with the second graphical user interface as at least one second vector;
    determining an intent of the user using the at least one first vector, the at least one second vector, and a predictive algorithm; and
    transmitting instructions to display a third graphical user interface for the user based upon the intent of the user.

2. The system of claim 1, wherein:
  the computing instructions, when executed on the one or more processors, further cause the one or more processors to perform a function comprising:
    training the predictive algorithm to predict the intent of the user; and
  determining the intent of the user comprises:
    determining the intent of the user using the at least one first vector, the at least one second vector, and the predictive algorithm, as trained.

3. The system of claim 2, wherein training the predictive algorithm comprises:
  training the predictive algorithm on a neural network to predict the intent of the user.

4. The system of claim 3, wherein the neural network comprises a feed forward neural network.

5. The system of claim 3, wherein at least one node in the neural network comprises a rectifier having ReLU non-linearity.

6. The system of claim 1, wherein the predictive algorithm comprises:
  a machine learning algorithm;
  a binary classifier; or
  a multi-class classifier.

7. The system of claim 1, wherein:
  the first data further comprises historical data of the user; and
  the second data further comprises in-session data of the user.

8. The system of claim 7, wherein the in-session data of the user:
  begins at a beginning of a session when the user is logged into an account at the beginning of the session, or begins after the beginning of the session when the user logs into the account during the session; and
  ends when the user ends the session while still logged into the account, or ends during the session when the user logs out of the account during the session.

9. The system of claim 1, wherein the first data or the second data comprise at least one of:
  a geographical location of the user;
  a date on which the first data or the second data is gathered;
  weather patterns at the geographical location of the user;
  current events at the geographical location of the user; or
  demographics of the user.

10. The system of claim 1, wherein the computing instructions, when executed on the one or more processors, further cause the one or more processors to perform functions comprising:
  combining the first data and the second data into third data;
  gathering fourth data comprising third interactions of the user with the third graphical user interface;
  storing the fourth data as at least one third vector; and
  determining a new intent of the user using the at least one third vector and the predictive algorithm; and
  transmitting instructions to display a fourth graphical user interface for the user based upon the new intent of the user.

11. A method being implemented via execution of computing instructions configured to run on one or more processors and stored at one or more non-transitory computer-readable media, the method comprising:
    gathering first data comprising first interactions of a user with a first graphical user interface;
    storing the first data comprising the first interactions of the user with the first graphical user interface as at least one first vector by adding to the at least one first vector for each level of a hierarchical categorization of the first graphical user interface;
    gathering second data comprising second interactions of the user with a second graphical user interface;
    storing the second data comprising the second interactions of the user with the second graphical user interface as at least one second vector;
    determining an intent of the user using the at least one first vector, the at least one second vector, and a predictive algorithm; and
    transmitting instructions to display a third graphical user interface for the user based upon the intent of the user.

12. The method of claim 11, wherein:
the method further comprises:
    training the predictive algorithm to predict the intent of the user; and
determining the intent of the user comprises:
    determining the intent of the user using the at least one first vector, the at least one second vector, and the predictive algorithm, as trained.

13. The method of claim 12, wherein training the predictive algorithm comprises:
    training the predictive algorithm on a neural network to predict the intent of the user.

14. The method of claim 13, wherein the neural network comprises a feed forward neural network.

15. The method of claim 13, wherein at least one node in the neural network comprises a rectifier having ReLU non-linearity.

16. The method of claim 11, wherein the predictive algorithm comprises:
    a machine learning algorithm;
    a binary classifier; or
    a multi-class classifier.

17. The method of claim 11, wherein:
the first data further comprises historical data of the user; and
the second data further comprises in-session data of the user.

18. The method of claim 17, wherein the in-session data of the user:
    begins at a beginning of a session when the user is logged into an account at the beginning of the session, or begins after the beginning of the session when the user logs into the account during the session; and
    ends when the user ends the session while still logged into the account, or ends during the session when the user logs out of the account during the session.

19. The method of claim 11, wherein the first data or the second data comprise:
    a geographical location of the user;
    a date on which the first data or the second data is gathered;
    weather patterns at the geographical location of the user;
    current events at the geographical location of the user; or
    demographics of the user.

20. The method of claim 11, further comprising:
    combining the first data and the second data into third data;
    gathering fourth data comprising third interactions of the user with the third graphical user interface;
    storing the fourth data as at least one third vector; and
    determining a new intent of the user using the at least one third vector and the predictive algorithm; and
    transmitting instructions to display a fourth graphical user interface for the user based upon the new intent of the user.

\* \* \* \* \*